United States Patent [19]

Hashimoto et al.

[11] Patent Number: 5,132,179
[45] Date of Patent: Jul. 21, 1992

[54] MAGNETIC RECORDING MEDIUM COMPRISING PLURAL MAGNETIC LAYERS

[75] Inventors: Hiroshi Hashimoto; Akira Ushimaru, both of Kanagawa, Japan

[73] Assignee: Fuji Photo Film Co., Ltd., Kanagawa, Japan

[21] Appl. No.: 679,394

[22] Filed: Apr. 2, 1991

[30] Foreign Application Priority Data

Apr. 2, 1990 [JP] Japan ................................. 2-84957

[51] Int. Cl.$^5$ ............................................. G11B 5/00
[52] U.S. Cl. .................................. 428/403; 428/425.9; 428/694; 428/900; 428/407; 427/128
[58] Field of Search ..................... 428/403, 425.9, 694, 428/900, 407; 427/128

[56] References Cited

U.S. PATENT DOCUMENTS

| | | | |
|---|---|---|---|
| 4,963,433 | 10/1990 | Ogawa et al. | 428/323 |
| 5,030,481 | 7/1991 | Hashimoto et al. | 427/130 |
| 5,045,351 | 9/1991 | Okita et al. | 427/128 |
| 5,082,733 | 1/1992 | Watanabe et al. | 428/403 |

FOREIGN PATENT DOCUMENTS 62-075930 4/1987 Japan .
63-146218 10/1988 Japan .

*Primary Examiner*—Paul J. Thibodeau
*Assistant Examiner*—Steven A. Resan
*Attorney, Agent, or Firm*—Sughrue, Mion, Zinn, Macpeak & Seas

[57] ABSTRACT

A magnetic recording medium comprising a non-magnetic support having thereon plural magnetic layers comprising a fine ferromagnetic powder and a binder and which are composed of at least two magnetic layers. In preparing the medium, a first magnetic layer-coating composition containing an epoxy compound having at least two epoxy groups is coated on the non-magnetic support and a second magnetic layer-coating composition containing a polyisocyanate compound is coated over the first magnetic layer with a simultaneous or successive multiple layered coating method. The medium has an excellent electromagnetic characteristic and yields few dropouts, and it is usable as a medium for high density recording.

10 Claims, No Drawings

MAGNETIC RECORDING MEDIUM COMPRISING PLURAL MAGNETIC LAYERS

FIELD OF THE INVENTION

The present invention relates to a magnetic recording medium for high density recording, in which the magnetic layers have a multilayer structure composed of at least two layers or more. In particular, it relates to a magnetic recording medium for high density recording, which has an extremely excellent electromagnetic characteristic, especially an excellent audio characteristic, and which yields few dropouts.

BACKGROUND OF THE INVENTION

Magnetic recording media are widely used as a recording tape, video tape, computer tape, floppy disc or the like. A magnetic recording medium of such a type fundamentally has a structure having a magnetic layer, which is obtained by dispersing a fine ferromagnetic powder in a binder, as laminated on a nonmagnetic support.

In general, a magnetic recording medium needs to exhibit high performance capability in a wide range of different types of characteristics, such as electromagnetic characteristic, running durability and running efficiency. In particular, with recent popularization of 8 mm-video, high-band 8 mm-video and S-VHS video tape recorders, a strong requirement has emerged for video tapes for use in such recorders which have especially excellent electromagnetic characteristics. For example, video recording tapes having a high video output and having an excellent original-reproducing ability are demanded.

Several conventional methods have been used to improve the electromagnetic characteristics of magnetic recording media. Above all, a method for improving the characteristics of the fine ferromagnetic powder, which is a magnetic recording substance in the media, is straight forward and effective. Accordingly, the fine ferromagnetic powder to be used in the recording media has been pulverized into an increasingly finer powder for the purpose of attaining high density recording with such fine powder. Suitable types of fine ferromagnetic powder materials include a modified iron oxide, such as iron oxide modified with one or more hetero atoms such as cobalt, which has come to be used in place of the non-modified iron oxide. Additionally, ferromagnetic metals such as iron, nickel or cobalt as well as alloys of such metals have come to be used.

By use of such improved fine ferromagnetic powders, it was thought that production of magnetic recording media having good electromagnetic characteristics would be more easily attainable. In fact, however, it is difficult to produce magnetic recording media having improved electromagnetic characteristics despite the improvements in fine ferromagnetic powders. This failure can be attributed to the following reasons. Specifically, the dispersibility of a fine ferromagnetic powder in a binder is lowered with any corresponding reduction of the grain size of the powder. Additionally, with respect to the characteristics of fine ferromagnetic powders, the dispersibility thereof in a binder becomes even lower in the following order: for example, $\gamma$-iron oxide, cobalt-deposited $\gamma$-iron oxide and fine powders of ferromagnetic metals. Therefore, the attempted improvements in fine ferromagnetic powders to be incorporated into the magnetic layer of recording media would often yield a result opposite to that desired. For example, the dispersion condition of the fine ferromagnetic powders in the magnetic layer would be adversely affected. As a consequence, the excellent characteristics of the improved fine ferromagnetic powders could not be displayed sufficiently.

Various conventional approaches have been proposed and actually carried out for improving the dispersibility of fine ferromagnetic powders in a binder to be used in the magnetic layer of recording media. For instance, improvement of binders has been illustrated in JP-B-58-41565, and JP-A-57-44227, JP-A-59-30235, JP-A-60-238306, JP-A-60-238309, JP-A-60-239371 and JP-A-61-172213 (the terms "JP-A" and "JP-B" as used herein refer to a "published unexamined Japanese patent application" and an "examined Japanese patent publication", respectively), where binders containing a polar group(s) such as $-SO_3M$, $-OSO_3M$, $-PO_3M_2$, $-OPO_3M_2$, $-COOM$, $-NR_2$ or $-N^+R_3X^-$ or binders containing both the polar group and epoxy ring(s) are used. The illustrated binders have a strong adsorbing power to fine ferromagnetic powders, and, therefore, the powders can be more effectively dispersed into the binders. However, even in the case of such improved binders, dispersion of fine ferromagnetic powders in these binders is found to be difficult if the grain size of the powders has been reduced for the purpose of attaining better high density recording. As a result, in that instance, the excellent electromagnetic characteristics of the fine ferromagnetic powders could not be displayed sufficiently. Therefore, development of a technique has been desired which enables the electromagnetic characteristics of fine ferromagnetic powders to be sufficiently displayed in the above mentioned high dispersing binders.

There is a known method of conducting kneading dispersion of the components used in producing a magnetic layer-coating composition for an extended period of time for the purpose of improving the dispersion condition of fine ferromagnetic powders in the coating composition. However, since a relatively large shear stress is imparted to the fine ferromagnetic powder during kneading dispersion thereof, the method has the drawback of causing deterioration of the intrinsic characteristics of the fine ferromagnetic powder itself. Additionally, the method demands lengthy periods of time for producing a magnetic recording medium, and, therefore, has another drawback insofar manufacture efficiency and manufacturing cost considerations.

In order to overcome these problems, other approaches have been proposed, which include a method of using a surface-treated fine ferromagnetic powder as treated with a surface-treating agent such as a silane coupling agent; a method of using a dispersing agent such as fatty acids or phosphates; and a method of using a binder as prepared by adding a low molecular epoxy resin to a system comprising a vinyl copolymer and an urethane prepolymer (as described in JP-B-56-23210).

Where a fine ferromagnetic powder is surface-treated by the above mentioned method of using a silane coupling agent or using a dispersing agent, the affinity of the surface of the thus treated fine ferromagnetic powder with a binder is improved and the dispersing rate of the powder in the binder is accelerated. However, as the fine ferromagnetic powder and the binder are not strongly bonded to each other in this instance, the dispersibility of the powder, including the dispersion stability thereof, in the binder is still insufficient.

Where a fine ferromagnetic powder is dispersed in the presence of a low molecular epoxy resin or epoxy group-containing compound along with a hardening agent of a polyisocyanate compound for the purpose of improving the mechanical strength of the magnetic layer to be formed and for improving the running durability of the same layer, the epoxy group would tend to be cleaved during the kneading and dispersing step in preparing the intended magnetic coating composition such that the resulting —OH group would react with the polyisocyanate compound present to thereby extremely shorten the pot life of the coating composition. This drawback is experienced during the process of preparing the coating composition.

On the other hand, with respect to the grain size of a fine ferromagnetic powder, if the size is extremely small, the powder have a large specific surface area. As a result, the thickness of the binder needed to cover the fine ferromagnetic powder becomes thin if the amount of the binder added to the powder is not correspondingly increased. In this instance, the breaking elongation of the magnetic layer containing the powder is relatively small, and, therefore, the magnetic layer is rendered extremely brittle. Where the magnetic layer is too brittle, the magnetic layer existing on the edge parts of the tape often would be cracked with ease. Further, the physical interaction between the finished magnetic layer and any parts of a recorder/playback machine would cause the magnetic layer to be broken and peeled off to cause a problem of an increase of dropouts. Additionally, there would be another problem in that the magnetic layer would be peeled off at the tape side edge portions as a result of the slitting step performed in preparing the magnetic tapes to also cause increase of dropouts.

In order to overcome these problems, a method of reducing the amount of the polyisocyanate compound to be added, or, alternatively, of further adding a plasticizer, may be employed. However, the method is effective only for preventing the brittleness of the magnetic layer at the expense of other needed characteristics. For example, the method causes an increase in the temperature dependence of the mechanical strength property of the magnetic layer and especially causes reduction of the mechanical strength of the layer at a high temperature. As a result, the running durability of the tape is thereby lowered.

Under these circumstances, development of a technique of highly dispersing a fine ferromagnetic powder having an extremely small grain size and a technique of producing a magnetic recording medium for high density recording, which may realize an extremely excellent electromagnetic characteristic and an extremely excellent running durability with little dropouts, has been highly desired.

SUMMARY OF THE INVENTION

The object of the present invention is to provide a magnetic recording medium for high density recording, which has a plural magnetic layers having a multilayer structure composed of at least two magnetic layers and has an extremely excellent electromagnetic characteristic, especially an excellent audio characteristic, with little dropouts.

The object of the present invention has been attained by a magnetic recording medium comprising a nonmagnetic support having thereon plural magnetic layers comprising a fine ferromagnetic powder and a binder, wherein the magnetic layers are composed of at least two magnetic layers and are formed by coating a first magnetic layer-coating composition containing an epoxy compound having at least two epoxy groups on the nonmagnetic support and coating a second magnetic layer-coating composition containing a polyisocyanate compound over the first magnetic layer with a simultaneous or successive multiple layered coating method. The second magnetic layer-coating composition can be coated after or simultaneously with coating of the first magnetic layer-coating composition.

DETAILED DESCRIPTION OF THE INVENTION

The magnetic recording medium of the present invention has plural magnetic layers having a multilayer structure composed of at least two magnetic layers. More particularly, it has plural magnetic layers composed of at least two magnetic layers including a first magnetic layer which is nearer in proximity to the support (the "lower magnetic layer") than a second magnetic layer which is adjacent to the lower magnetic layer but which is further removed from the support (the "upper magnetic layer").

In the multilayer structure of the magnetic layers in the recording medium of the present invention, one epoxy group of the epoxy compound used in the first magnetic layer adsorbs to the surfaces of the fine powdery ferromagnetic grains and reacts with the grains. Thereupon, the adsorbed epoxy compound acts as a dispersing agent to thereby improve the dispersibility of the fine ferromagnetic powder. As a result, the fine ferromagnetic powder can sufficiently display its intrinsic capability in terms of extremely excellent electromagnetic characteristic. Further, the remaining epoxy group strongly bonds to the binder to noticeably elevate the mechanical strength of the magnetic layers. As a consequence of this, the medium displays another excellent characteristic insofar as it yields few dropouts.

Specifically, in the medium of the present invention, the epoxy compound to be used in the first magnetic layer functions to record an audio signal having a relatively long wavelength and acts to strongly enhance the bond between the fine ferromagnetic powder and the binder. As a result, extremely high dispersibility and fillability of the powder in the first magnetic layer as well as a sufficient surface smoothness of the first magnetic layer can be realized. Additionally, the breaking elongation of the magnetic layers comprising the first and second magnetic layers may be enlarged noticeably to prevent the edge parts of the magnetic layers from breaking down. Thus, the present invention realizes provision of an excellent magnetic recording medium yielding few dropouts in use.

The first magnetic layer-coating composition may be prepared either by kneading a fine ferromagnetic powder and an epoxy compound along with a part of a binder and a solvent followed by adding the remaining binder and solvent to the resulting blend to give a dispersion, or, alternatively, by dispersing a fine ferromagnetic powder, which was previously surface-treated with the epoxy compound having at least two epoxy groups into a binder. In either case, the dispersibility is further improved of the fine ferromagnetic powder in the first magnetic layer coating composition being prepared for coating onto a support. Therefore, both a high electromagnetic characteristic and a high breaking elongation of the magnetic layers are obtained by the present invention.

In order to further elevate the mechanical strength of the magnetic layers of the present invention, the use of a conventional polyisocyanate compound as a hardening agent is effective. In this regard, it is effective to enlarge the breaking elongation of the first magnetic layer, which is in direct contact with the nonmagnetic support, for preventing dropout from the edge parts of the magnetic layers. The epoxy compound when bonding to the surfaces of the powdery fine ferromagnetic grains not only reacts with and bonds to the binder at the remaining free epoxy group(s) in the compound, but also reacts with water in the system during kneading and dispersion to undergo cleavage to release —OH group(s), and the cleaved —OH group(s) bond to the existing polyisocyanate compound to thereby further elevate the mechanical strength of the magnetic layers.

However, the reaction between the —OH group cleaved from the epoxy compound and the isocyanate group (—NCO group) of the polyisocyanate compound is extremely rapid, and, therefore, the two groups react with each other during kneading and dispersing the components for preparing the coating composition. As a result, the pot life of the coating composition is extremely short when the composition is prepared by a conventional method. As a result, therefore, conventional production of a magnetic recording medium from the combination of the above mentioned materials has been impossible.

Accordingly, in the present invention, the first magnetic layer-coating composition does not substantially contain a polyisocyanate compound but, instead, only the second magnetic layer-coating composition contains a polyisocyanate compound. The second magnetic layer is coated over the first magnetic layer either successively or simultaneously, while the first magnetic layer is still wet. The polyisocyanate compound to be used in the second magnetic layer coated over the wet first magnetic layer, behaves so as to diffuse into the first magnetic layer in an extremely short period of time before the solvent therein has been dried up. Therein, the polyisocyanate compound reacts with the —OH group cleaved from the epoxy compound present in the first magnetic layer. As a result, the mechanical strength of the thus formed magnetic layers is improved extremely. Additionally, the coating compositions of the present invention are free from the problem of having a short pot life since the polyisocyanate compound is not given the opportunity to inter-react with the —OH groups cleaved from the epoxy compound until only after the magnetic coating compositions have already been coated on the nonmagnetic support. This contrasts the conventional practice where these compounds were inter-mixed during coating preparation procedures. Specifically, in accordance with the present invention, the advantageous addition of the polyisocyanate hardening agent to the second magnetic layer-coating composition immediately before coating has been recognized and exploited.

In the present invention, the first magnetic layer-coating composition does not substantially contain a polyisocyanate compound. In the present invention, the term "does not substantially contain a polyisocyanate compound" as referred to herein means that the composition may contain a polyisocyanate compound only in an extremely slight amount (i.e., less than 0.1 wt% per the total weight of the fine ferromagnetic powder) within the range of not causing elevation of the viscosity of the coating composition. Preferably, however, the first magnetic layer-coating composition contains no polyisocyanate compound. Similarly, the second magnetic layer-coating composition of the present invention does not substantially contain an epoxy compound. Preferably, the second magnetic layer-coating composition contains no epoxy compound.

As mentioned above, the present invention is the first proposal in the field which has attained a magnetic recording medium having a high level audio characteristic with few dropouts, as such high level characteristic could not be realized by any conventional single magnetic layer-type magnetic recording medium. The features and effects of the present invention are explained in even greater detail below.

Suitable epoxy compounds for use in the present invention include, for example, bisphenol A type epoxy resins, glycidylamine type epoxy resins, novolak type epoxy resins, bisphenol F type epoxy resins, glycidyl ester type resins, alicyclic epoxy resins and aliphatic epoxy resins, which are commercially available resins. In addition, glycidyl methacrylate monomers and glycidyl phenyl ethers also may be preferably used for dispersing the ferromagnetic powder of the present invention. Preferably, the above epoxy compounds have a molecular weight of 1,000 or less and an epoxy equivalent of 200 g/eq or less.

Chemical structures of exemplary epoxy compounds for use in the present invention are described below.

(A) Bisphenol A type epoxy resins (hereinafter referred to as "epi-bis type epoxy resins") for use in the present invention are those of the following formula:

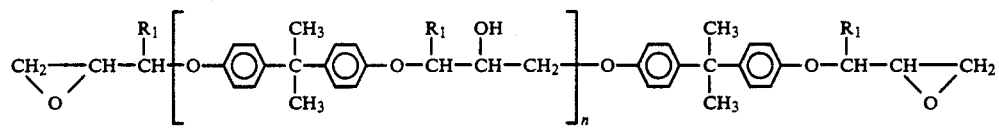

where n is from 0 to 3; and $R_1$ is —H or —$CH_3$.

(B) Glycidylamine type epoxy resins are those of the following formulae (1) to (3):

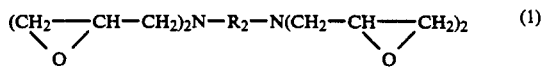

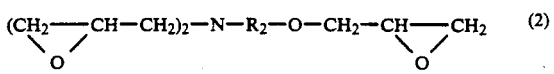

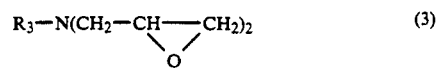

-continued where $R_2 =$  (o-, m-, p-),

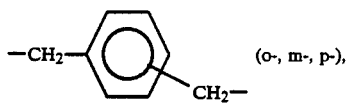 (o-, m-, p-),

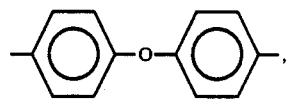,

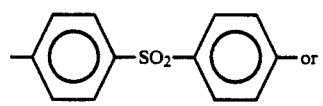 or

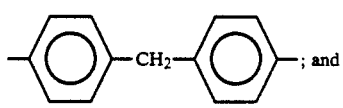 ; and $R_3 =$ 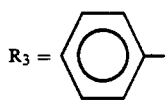

or a hydrocarbon residue having from 4 to 24 carbon atoms.

(C) Novolak type epoxy resins are those of the following formula:

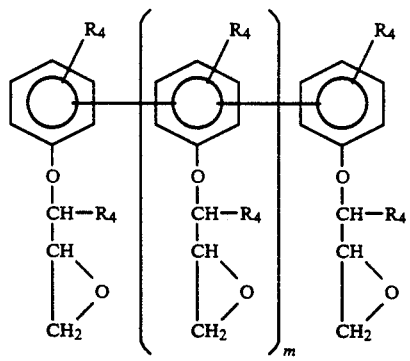

where
$R_4 = -H$ or $-CH_3$; and
$m = 0$ to $10$.

(D) Bisphenol F type epoxy resins are those of the following formula:

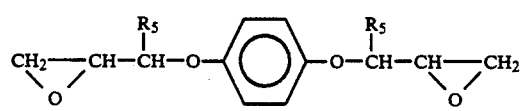

where $R_5 = -H$ or $-CH_3$.

(E) Glycidyl ester resins are those of the following formula:

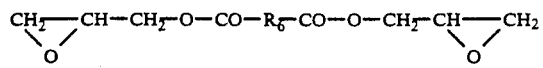

where $R_6 =$  (o-, m-, p-),

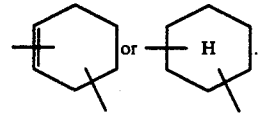

(F) Resorcinol diglycidyl ether is shown below:

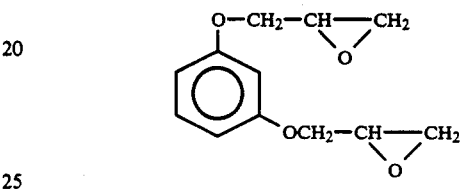

Preferred epoxy compounds for use in the present invention are amine type epoxy resins. Particularly preferred epoxy compounds are glycidylamine type epoxy resins.

Specific examples of the above described types epoxy compounds for use in the present invention include Epiol A, B, P, OH, M, EH, G-100, SB and TB (produced by Nippon Oils and Fats Co.), YH-434, YH-434L, YDPN-638, YDCN-701S, YDCN-702S and YDCN-703S (produced by Toto Chemical Co.), Epikote 801, Epikote 802, Epikote 807, Epikote 815, Epikote 825 and Epikote 828 (produced by Shell Co.), GY250, GY257 and GY260 (produced by Ciba-Geigy AG), and TETRAD-X and TETRAD-C (produced by Mitsubishi Gas Chemical Co.).

The above mentioned epoxy compounds for use in the present invention have a molecular weight of generally 1,000 or less and preferably from 200 to 600. If the molecular weight is more than 1,000, the desired effect of the epoxy compounds of improving the dispersibility of the fine ferromagnetic powder of the present invention tends to be diminished, further, the addition of such higher molecular weight compounds tends to unfavorably diminish the durability of the magnetic recording medium of the present invention. As noted above, these epoxy compounds are desired to have an epoxy equivalent of 200 g/eq or less and particularly 150 g/eq or less. If the value is more than 200 g/eq, the effect of the compounds of improving the dispersibility of the fine ferromagnetic powder tends to be unfavorably lowered.

The above mentioned epoxy compounds are generally used in an amount of from 0.1 to 5 parts by weight per 100 parts by weight of the fine ferromagnetic powder in the first magnetic layer. The preferred amount of the epoxy compound is from 0.15 to 4 parts by weight per 100 parts by weight of the fine ferromagnetic powder, whereby the dispersion of the powder is further improved and the surface gloss of the surface of the magnetic layer coated is elevated. More preferably, the amount of the epoxy compound is from 0.2 to 3.5 parts by weight, whereby the electromagnetic characteristic of the magnetic recording medium to be formed is even more improved. If the amount of epoxy compound is less than 0.1 part by weight, the effect of the epoxy compound added might not be expressed satisfactorily. On the other hand, if the epoxy compound is incorporated in an amount larger than 5 parts by weight, the dispersibility of the ferromagnetic powder is not noticeably improved any further.

The polyisocyanate compound to be used in the second magnetic layer of the present invention may be selected from polyisocyanate compounds which are generally used as a hardening agent for polyurethane resins. For instance, preferred examples include reaction products of 3 mols of tolylene diisocyanate and 1 mol of trimethylolpropane; reaction products of 3 mols of xylylene diisocyanate or hexamethylene diisocyanate and 1 mol of trimethylolpropane; biuret adducts with 3 mols of hexamethylene diisocyanate; isocyanurate compounds with 5 mols of tolylene diisocyanate; isocyanurate adducts composed of 3 mols of tolylene diisocyanate and 2 mols of hexamethylene diisocyanate; and polymers of isophorone diisocyanate and diphenylmethane diisocyanate.

The above mentioned polyisocyanate compound to be used in the second magnetic layer is contained in an amount of generally from 2 to 10 parts by weight and preferably from 3 to 9 parts by weight, per 100 parts by weight of the fine ferromagnetic powder in the second magnetic layer.

The fine ferromagnetic powder for use in the present invention may be any conventional fine ferromagnetic powder, including for example, a fine powder of $\gamma$-$FeO_x$ (where x is from 1.33 to 1.5), a fine powder of Co-modified $\gamma$-$FeO_x$ (where x is from 1.33 to 1.5), a fine powder of chromium dioxide, a fine powder of a ferromagnetic metal of Fe, Co or Ni, as well as a fine powder of barium ferrite or strontium ferrite. These fine ferromagnetic powder may further contain any other atoms of Al, Si, S, Sc, Ti, V, Cr, Cu, Y, Mo, Rh, Pd, Mg, Sn, Sb, Te, Ba, Ta, W, Re, Au, Hg, Pb, Bi, La, Ce, Pr, Nd, P, Co, Mn, Zn, Ni, Sr and/or B. The shape of the fine ferromagnetic powder for use in the present invention is not particularly limited, but, in general, it contains acicular grains or granular grains. Regarding the size of the fine ferromagnetic powder, the ferromagnetic powder for the first magnetic layer has a specific surface area (by BET method) of generally 45 $m^2/g$ or less (preferably 40 $m^2/g$ or less) and a crystallite size of generally 290 Å or more (preferably 330 Å or more); and the ferromagnetic powder for the second magnetic layer has a specific surface area (by BET method) of generally 30 $m^2/g$ or more (preferably 40 $m^2/g$ or more) and a crystallite size of generally 400 Å or less (preferably 330 Å or less). The specific surface area (by BET method) of the fine ferromagnetic powder for the first magnetic layer is smaller than that of the powder for the second magnetic layer, and the difference therebetween is preferably more than 5 $m^2/g$.

As the fine ferromagnetic powder used in the second magnetic layer, one having a crystallite size of preferably 350 Å or less, more preferably 250 Å or less, is especially effective.

The pH value of the fine ferromagnetic powder is not particularly limited but may be either in an acidic range (preferably from 4 to 7) or a basic range (preferably from 8 to 12). However, it is especially effectively at a pH of 8 or more.

The binder for use in the present invention may be selected from conventional ones. Examples of binders for use in the present invention include vinyl chloride copolymers. As comonomers for the copolymers, vinyl esters of fatty acids such as vinyl acetate or vinyl propionate, alkyl (meth)acrylates such as methyl acrylate, ethyl acrylate, propyl acrylate, lauryl acrylate, stearyl acrylate, methyl methacrylate or ethyl methacrylate, as well as vinylidene chloride are preferred, as having an effect of elevating the solvent solubility of the copolymers. Examples of —OH group-containing comonomers for the vinyl chloride copolymers include vinyl alcohols, hydroxyethyl (meth)acrylates, hydroxypropyl (meth)acrylates, hydroxybutyl (meth)acrylates, hydroxylauryl (meth)acrylates, hydroxystearyl (meth)acrylates, polyethylene glycol (meth)acrylates, polypropylene glycol (meth)acrylates, hydroxyethyl allyl ether, hydroxypropyl allyl ether and hydroxybutyl allyl ether. These comonomers are preferred for bonding to polyisocyanate compounds or epoxy compounds present to elevate the mechanical strength of the magnetic layers. The —OH group for the above vinyl chloride copolymers does not affect the pot life because of having a low reaction rate. Additionally, maleic acid, (meth)acrylic acids, acrylonitrile, ethylene and styrene may also be used as comonomers for the vinyl chloride copolymers.

As other examples of usable binders, there are mentioned acrylic resins such as polymethyl methacrylates. As comonomers for the acrylic resins, those which have been mentioned above as usable for preparing the above mentioned vinyl chloride copolymers also may be used herein. Additional examples of usable binders include cellulose resins such as nitrocellulose, cellulose acetate propionate and cellulose acetate butyrate; as well as polyvinyl acetal resins, polyvinyl butyral resins, epoxy resins, phenoxy resins, polyester polyurethane resins, polyether polyurethane resins, polyether polyester polyurethane resins, polycarbonate polyurethane resins, polyester resins, polyether resins, and various rubber resins.

Above all, preferred binders are vinyl chloride resins, acrylic resins, cellulose resins, polyurethane resins, polyester resins, and polyether resins.

Preferably, a polar group is introduced into the molecules of the above mentioned binders for the purpose of further elevating the dispersibility of the fine ferromagnetic powder and the durability of the magnetic recording medium to be formed. Examples of suitable polar groups include —COOM, —$SO_3M$, —$SO_4M$, —$PO_3M_2$, —$OPO_3M_2$, an amino-group, an ammonium base, —OH, —SH, and an epoxy group, in which M means a hydrogen atom, an alkali metal or an ammonium group. Where one group has plural M's, they may be the same as or different from each other.

The content of the polar group is preferably from $1 \times 10^{-7}$ to $1 \times 10^{-3}$ equivalents, more preferably from $0.5 \times 10^{-5}$ to $60 \times 10^{-5}$ equivalents, per gram of binders, for the case of —COOM, —$SO_3M$, —$SO_4M$, —$PO_3M_2$, —$OPO_3M_2$, an amino group or an ammonium base. The content is preferably from $5 \times 10^{-5}$ to $200 \times 10^{-5}$ equivalents, per gram of binders, for the case of —OH, —SH or an epoxy group. If the content of the polar group is less than the above ranges, the desired effect to be caused by the group may be insufficient. However, if it is more than the above ranges, the solvent solubility of the binder would worsen and also the dispersibility of the fine ferromagnetic powder would decrease.

The binder preferably has a molecular weight of from 10,000 to 100,000, more preferably from 20,000 to 60,000, as a weight average molecular weight.

As especially preferred examples of such polar group-containing binders for use in the present invention, there are mentioned (1) polyurethane resins having three or more —OH groups in the molecule and having the above polar group other than an —OH group in an amount of from $0.5 \times 10^{-5}$ eq/g to $60 \times 10^{-5}$ eq/g, and (2) vinyl chloride or acrylic resins having an —OH group in an amount of from $5 \times 10^{-5}$ to $200 \times 10^{-5}$ eq/g, an epoxy group in an amount of from $0.5 \times 10^{-5}$ to $100 \times 10^{-5}$ eq/g and the above polar group other than an —OH group and an epoxy group in an amount of from $0.5 \times 10^{-5}$ to $60 \times 10^{-5}$ eq/g and having a polymerization degree of from 200 to 600.

The binders may be used singly or as a mixture of plural binder compounds thereof. The binder in the first magnetic layer and that used in the second magnetic layer may be the same or different from each other, in accordance with the particular requirements to be met.

The total content of the binder in the magnetic layers of the magnetic recording medium of the present invention is generally from 10 to 100 parts by weight per 100 parts by weight of the total fine ferromagnetic powder, preferably from 15 to 40 parts by weight.

More preferably, the magnetic recording medium of the present invention contains other additives such as a carbon black, an abrasive and other conventional additives.

Examples of the carbon black usable in the present invention include furnace black for rubbers, thermal black for rubbers, carbon black for colors and acetylene black.

The carbon black used in the present invention is one having a specific surface area of from 5 to 500 m²/g, a DBP oil absorption of from 10 to 400 ml/100 g, a grain size of from 5 nm to 300 nm, a pH value of from 2 to 10, a water content of from 0.1 to 10% and a tap density of from 0.1 to 1 g/ml. The tap density can be measured in the following manner. Into a 100 ml mess-cylinder is placed 10 to 40 g of carbon black. The mess-cylinder is allowed to drop from the height of 3 cm by gravity. This is repeated 100 times. Thereafter, the volume is divided by the weight. The resulting value is referred to as the tap density.

Specific examples of carbon blacks usable in the present invention include BLACKPEARLES 2,000, 1,300, 1,000, 900, 800 and 700 and VULCAN XC-72 (manufactured by Cabot Co.), #80, #60, #55, #50 and #35 (manufactured by Asahi Carbon Co.), #2400B, #2300, #900, #1000, #30, #40 and #10B (manufactured by Mitsubishi Chemical Corp.) and CONDUCTEX SC, RAVENS 150, 50, 40 and 15 (manufactured by Columbia Carbon Co., Ltd.). The carbon black for use in the present invention may be previously surface-treated with a dispersing agent or may be grafted with a resin or a part of the surface thereof may be graphitized, before use. If desired, the carbon black may be pre-dispersed in a binder to form a dispersion before addition to the magnetic coating composition of the present invention.

Carbon black can serve various functions such as preventing static charges, reducing a friction coefficient, imparting a light-shielding property and improving a film strength. Such functions vary, depending upon the kind of the type of carbon black to be used. Accordingly, it follows that the type of carbon black to be added to the first magnetic layer and the second magnetic layer in the magnetic recording medium of the present invention as well as the respective amounts thereof may properly be selected and determined from various kinds and combinations of various carbon blacks on the basis of the above mentioned various properties thereof such as the grain size, the oil absorption amount, the electroconductivity and the pH value. For instance, a carbon black having a high electroconductivity is added to the first magnetic layer so as to prevent static charges on the surface of the layer and a carbon black having a large grain size is added to the second magnetic layer so as to lower the friction coefficient of the magnetic layer.

Regarding the carbon blacks for use in the present invention, for example, the disclosure of *Handbook of Carbon Blacks* (edited by Carbon Black Association of Japan) may be referred to.

It is preferred that the carbon black to be used in the first magnetic layer is one having a mean grain size of less than 20 nm and the content thereof is from 1 to 20 parts by weight per 100 parts by weight of the fine ferromagnetic powder in the layer, and that the carbon black to be used in the second magnetic layer is one having a mean grain size of from 40 to 80 nm and the content thereof is from 0.1 to 10 parts by weight per 100 parts by weight of fine ferromagnetic powder in the layer.

As the abrasive usable in the present invention, any known materials essentially having a Mohs' hardness of 6 or more may be used singly or as a mixture thereof. Such abrasive materials include, for example, α-alumina having an alpha-conversion of 90% or more, β-alumina, silicon carbide, chromium oxide, cerium oxide, γ-iron oxide, corundum, artificial diamond, silicon nitride, silicon carbide, titanium carbide, silicon dioxide, and boron nitride. Composites composed of such abrasives (which are prepared by surface-treating one abrasive material with another abrasive material) may also be used. Such abrasives may often contain any other compounds or elements than the principal component, but the content of the principal component may be 90% or more for attaining the intended effect. The abrasives preferably has a grain size of from 0.01 to 2 μm. If desired, plural abrasives each having a different grain size may be combined, or a single abrasive having a broad grain size distribution may be employed so as to attain the same effect as such a combination. Preferably, the abrasives for use in the present invention are those having a tap density of from 0.3 to 2 g/ml, a water content of from 0.1 to 5%, a pH value of from 2 to 11 and a specific surface area of from 1 to 30 m²/g.

The shape of the abrasives to be used in the present invention may be any of acicular, spherical and die-like shapes. Preferably, the abrasive has a shape partly with edges, because a high abrasive property is given.

Specific examples of abrasives for use in the present invention include AKP-20, AKP-30, AKP-50 and HIT-50 (manufactured by Sumitomo Chemical Co.), G5, G7 and S-1 (manufactured by Nippon Chemical Industrial Co.) and 100ED and 140ED (manufactured by Toda Industrial Co.).

As a matter of course, it is possible to independently select the kinds and the amounts of the abrasives to be added to the first magnetic layer and the second magnetic layer of the magnetic recording medium of the present invention in accordance with the use of the medium. For instance, the amount of the abrasives to be added to the second magnetic layer may be elevated for the purpose of improving the durability of the surface of the magnetic layer, while the amount of the abrasives to be added to the first magnetic layer may be elevated for the purpose of improving the durability of the edges of the magnetic layer. Most preferably, the first magnetic layer contains abrasives having a Mohs' hardness of less than 7 and the second magnetic layer contains abrasives having a Mohs' hardness of 7 or more.

The abrasives may be pre-dispersed in a binder and the resulting dispersion may be added to the magnetic layer-coating compositions thereafter.

The amount of the abrasive grains to be provided on the surface and on the edges of a magnetic layer in the magnetic recording medium of the present invention is preferably 5 grains/100 $\mu m^2$ or more.

As other additives that can be used in the magnetic recording medium of the present invention, those having a lubricating effect, an antistatic effect, a dispersing effect and a plasticizing effect may be used. For instance, examples of usable additives include molybdenum dioxide, tungsten dioxide, graphite, boron nitride, graphite fluoride, silicone oil, polar group-containing silicones, fatty acid-modified silicones, fluorine-containing silicones, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, monobasic fatty acids having from 10 to 24 carbon atoms (which may optionally contain unsaturated bond(s) and which may optionally be branched) and metal salts thereof (for example, with Li, Na, K or Cu), mono-, di-, tri-, tetra-, penta- or hexa-alcohols having from 12 to 22 carbon atoms (which may optionally contain unsaturated bond(s) and may optionally be branched), alkoxyalcohols having from 12 to 22 carbon atoms, mono-fatty acid esters, di-fatty acid esters or tri-fatty acid esters composed of a mono-basic fatty acid having from 10 to 24 carbon atoms (which optionally may contain unsaturated bond(s) and may optionally be branched) and any one of mono-, di-, tri-, tetra-, penta- and hexa-alcohols having from 2 to 12 carbon atoms (which optionally may contain unsaturated bond(s) and may optionally be branched), fatty acid esters of mono-alkyl ethers of alkylene oxide polymers, fatty acid amides having from 8 to 22 carbon atoms, and aliphatic amines having from 8 to 22 carbon atoms. Specific examples of such additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

Additionally, other additives which optionally may be used include nonionic surfactants such as alkylene oxides, glycerin derivatives, glycidol derivatives or alkylphenol-ethylene oxide adducts; cationic surfactants such as cyclic amines, ester amides, quaternary ammonium salts, hydantoin derivatives, heterocyclic compounds, phosphonium derivatives or sulfonium derivatives; anionic surfactants containing an acidic group such as carboxylic acid, sulfonic acid, phosphonic acid, sulfate or phosphate group; and ampholytic surfactants such as amino acids, aminosulfonic acids, sulfate or phosphate esters of amino alcohols or alkylbetains. The details of these surfactants are described in *Handbook of Surfactants* (published by Sangyo Tosho Publishing Co., Japan).

These lubricants and antistatic agents may not always be 100% pure substances, but, instead, may contain impurities such as isomers, non-reacted materials, by-products, decomposed products and oxides, in addition to the main component. However, the content of such impurities is preferably 30% or less, more preferably 10% or less.

The kinds and amounts of these lubricants and surfactants to be used in the first magnetic layer and the second magnetic layer of the recording magnetic medium of the present invention may properly be selected in accordance with the use of the medium. For instance, the first and second magnetic layers can separately contain different lubricants and surfactants, for example, fatty acids each having a different melting point so as to prevent bleeding out of the acids to the surface, or different esters each having a different boiling point or a different polarity used in the two magnetic layers so as to prevent bleeding out of the esters to the surface. Also, the amounts of surfactants to be used in the two magnetic layers are controlled so as to improve the coating stability, or the ratio of the amount of the lubricant to the amount of fine ferromagnetic powder in the first magnetic layer is made larger so as to improve the lubricative effect of the surface thereof. Needless to say, these examples by no means represent an exhaustive list of the possible arrangements as will be recognized by persons of skill in the field.

All the additives to be used in the present invention, or a portion thereof, may be added to the magnetic coating compositions in any step of preparing the magnetic coat compositions. For instance, illustrations include a case of blending additives with a fine ferromagnetic powder before the kneading step; a case of adding additives during the step of kneading the fine ferromagnetic powder, binder and solvent; a case of adding additives during the dispersing step; a case of adding additives after the dispersing step; and a case of adding additives immediately before coating the magnetic composition.

Examples of commercially available lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SO-60R, Nonion OP-80R, Nonion OP-85R, Nonion LT-221, Nonion ST-221, Nonion TO-221, Monogly MB, Nonion DS-60, Anon BF, Anon LG, butyl stearate, butyl laurate and erucic acid (manufactured by Nippon Oils and Fats Co.); oleic acid (manufactured by Kanto Chemical Co.); FAL-205 and FAL-123 (manufactured by Takemoto Oils and Fats Co.); Enujerubu LO, Enujerubu IPM and Sansosyzer E4030 (manufactured by Shin Nihon Rika Co., Ltd.); TA-3, KF-96, KF-96L, KF-96H, KF410, KF420, KF965, KF54, KF50, KF56, KF907, KF851 X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shin-Etsu Chemical Co.); Armide P, Armide C and Armoslip CP (manufactured by Lion Ahmer Co. Ltd.); Duomin TDO (manufactured by Lion Fat and Oil Co. Ltd.); BA-41G (manufactured by Nisshin Oil Mill Ltd.); Profan 2012E, Newpole PE61, Ionet MS-400, Ionet MO- 200, Ionet DL-200, Ionet DS-300, Ionet DS-1000 and Ionet DO-200 (manufactured by Sanyo Chemical Co. Ltd.).

It is preferred that the amount of the lubricant to be used in the second magnetic layer is larger than that used in the first magnetic layer.

The organic solvents to be used in the magnetic layers are not particularly limited in type or desired proportion. Examples of suitable organic solvents include ketones such as acetone, methyl ethyl ketone, methyl isobutyl ketone, diisobutyl ketone, cyclohexanone and isophorone; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chlorofrom, ethylenechlorohydrin and dichlorobenzene; as well as N,N-dimethylformamide, hexane and tetrahydrofuran.

The organic solvents for use in the present invention may not necessarily be 100% pure, but, instead, may contain impurities such as isomers, non-reacted materials, by-products, decomposed products, oxides and water, in addition to the essential component. However, the content of such impurities is preferably 30% or less, more preferably 10% or less.

The kinds and amounts of the organic solvents to be used in the first and second magnetic layers constituting the magnetic recording medium of the present invention may be properly selected in accordance with the use of the medium. For instance, a highly volatile solvent is used in the first magnetic layer so as to improve the surface property of the layer, or a solvent having a high surface tension (for example, cyclohexanone or dioxane) is used in the first magnetic layer-coating composition so as to improve the coating stability, or a solvent having a high solubility parameter is used in the second magnetic layer-coating composition so as to elevate the packing density in the layer. Needless to say, the above examples are not limitative.

Regarding the selection of the thicknesses of the respective elements of the magnetic recording medium of the present invention, the thickness of the non-magnetic support is generally from 1 to 100 $\mu$m, preferably from 6 to 20 $\mu$m; the thickness of first magnetic layer is generally from 1.0 to 10 $\mu$m, preferably from 1.5 to 5 $\mu$m; and the thickness of the second magnetic layer is 4.0 $\mu$m or less, preferably 3.5 $\mu$m or less. The thickness of the magnetic layer composed of the first and second magnetic layers is within the range of from 1/100 to 2 times the thickness of the nonmagnetic support. A subbing layer may be provided between the nonmagnetic support and the first magnetic layer for improving the adhesiveness therebetween and/or an interlayer containing an antistatic carbon black may be provided. The thickness of the subbing layer or interlayer may be generally from 0.01 to 2 $\mu$m, preferably from 0.05 to 0.5 $\mu$m. Additionally, a backing coat layer may be provided to the back surface of the nonmagnetic support which is opposite to the magnetic layer-coated surface side. The thickness of the backing layer may be generally from 0.1 to 2 $\mu$m, preferably from 0.3 to 1 $\mu$m. Such subbing layer or interlayer and backing coat layers may be selected from conventional ones.

As the nonmagnetic support for use in the present invention, conventional films can be used. For example, examples of such conventional films include films of polyesters such as polyethylene terephthalate or polyethylene naphthalate; as well as polyolefins, cellulose triacetate, polycarbonate, polaymide, polyimide, polyamidoimide, and polysulfone. The supports may be pre-treated by corona discharge treatment, plasma treatment, adhesion-enhancing treatment, heat treatment, or dust-removing treatment. The nonmagnetic support for use in the present invention is preferably one having a center line mean surface roughness (Ra) of 0.03 $\mu$m or less, especially preferably 0.02 $\mu$m or less, more preferably 0.01 $\mu$m or less (defined by JIS B 0601). In this instance, the cut-off value is 0.25 mm. Additionally, it is preferred that the nonmagnetic support for use in the present invention not only has such a small center line mean surface roughness but also is free from relatively rough projections having a size of 1 $\mu$m or more on the surface thereof. The surface roughness of the support may be independently controlled, if desired, in accordance with the size and amount of the filler to be added to the support. As examples of fillers usable for this purpose, examples include fine powders of oxides or carbonates of Ca, Si or Ti as well as those of organic substances such as acrylic materials.

The nonmagnetic support for use in the present invention preferably has an F-5 value (i.e., the load at the 5% elongation) of from 5 to 50 kg/mm$^2$ in the tape-running direction and an F-5 value of from 3 to 30 kg/mm$^2$ in the width-wise direction of tape. In general, the F-5 value in the length-wise direction of tape is higher than that in the width-wise direction thereof. However, this arrangement does not apply to the case where the width-wise strength of tape is intended to be especially elevated.

The thermal shrinkage at 100° C. for 30 minutes of the nonmagnetic support for use in the present invention is preferably 3% or less and more preferably 1.5% or less, in both the tape-running direction and the widthwise direction and further the thermal shrinkage at 80° C. for 30 minutes is preferably 1% or less, more preferably 0.5% or less in both directions. The breaking strength of the support is preferably from 5 to 100 kg/mm$^2$ in both directions; and the modulus of elasticity thereof is preferably from 100 to 2,000 kg/mm$^2$ in both directions.

A method of preparing the magnetic recording medium of the present invention is described in greater detail.

The process of preparing the magnetic layer-coating compositions for use in the present invention comprises at least a kneading step, a dispersing step and optionally a blending step(s) to be carried out before and/or after the kneading and dispersing steps. Any of these respective steps may be composed of two or more separate stages.

The above steps are performed with conventional equipment. For instance, employment of powerful kneading machines such as open kneader, pressure kneader or continuous kneader is preferred in performance of the kneading step.

In particular, in preparing a magnetic composition for coating the first magnetic layer, it is preferred to add a portion or all of epoxy compound and binder to the fine ferromagnetic powder along with solvent and to strongly knead them. The epoxy groups in the epoxy compound bond to the surfaces of the fine powdery ferromagnetic powder and to the binder owing to the shear and the accompanying heat during the kneading step. After the kneading step, the remaining binder and solvent are gradually added to the resulting blend, which is then diluted and dispersed to form a coating composition having a coatable viscosity. The coating composition prepared by the process of the present invention realizes an extremely high dispersing property.

Alternatively, a fine ferromagnetic powder, an epoxy compound and a solvent are previously blended and dispersed and thereafter the solvent is evaporated and dried up from the resulting blend. Then, the fine ferromagnetic powder as previously surface-treated with the epoxy compound is kneaded and dispersed in the same way as mentioned above. Nonetheless, almost the same magnetic coating composition may be prepared by either of the above protocol.

Preparation of the second magnetic layer-coating composition may be performed with the same protocol as mentioned above for the first magnetic layer, except that no epoxy compound is added to the composition. The polyisocyanate compound to be used in the composition of the second magnetic layer is preferably added thereto after the dispersion step and immediately before coating the composition.

The other above mentioned additives may be added to the magnetic layer compositions at any step of preparing the compositions.

As coating techniques for coating the first and second magnetic layers on the nonmagnetic support in order to prepare the magnetic recording medium of the present invention, a simultaneous or successive wet-on-wet coating system is employed, as described, for example, in JP-A-62-212933. The object of the present invention may be attained only by such simultaneous or successive wet-on-wet coating system techniques. Specifically, the low molecular compounds diffuse between the first magnetic layer and the second magnetic layer as laminated while they still remain wet during an extremely short period of time. Accordingly, the polyisocyanate compound in the second magnetic layer diffuses into the first magnetic layer before the two layers are completely dried. Afterwards, the epoxy compound, binder and polyisocyanate compound are bonded to each other and hardened in the first magnetic layer to give a film having an extremely high mechanical strength.

Where the magnetic recording medium of the present invention is used as a tape, the magnetic layers as coated on the nonmagnetic support are generally post-treated for orienting the fine ferromagnetic powder in the layers. For example, orientation is performed by magnetic field orientation treatment, and thereafter the tape is dried. Further, the surface of the thus prepared magnetic recording medium of the present invention is treated for smoothening it and then the medium is cut into the desired shape.

As mentioned above, the magnetic recording medium of the present invention has extremely excellent audio characteristics and yields few dropouts even if it is repeatedly run. For instance, when the magnetic recording medium is used as a video tape, it displays a high reproducing output and has good running property and durability even under a severe condition of high temperature and high humidity. Such excellent characteristics of the magnetic recording medium of the present invention are attributable to the two-layered magnetic layer unit as formed in the medium. In contrast to the medium of the present invention, when an epoxy compound and a polyisocyanate compound are combined in a conventional single magnetic layer containing recording medium, it is necessary to prepare a coating composition containing the both epoxy and polyisocyanate compounds. In that case, however, the pot life of the coating composition is extremely short in the actual manufacture process, even if one of either the epoxy compound or polyisocyanate compound is added later to the composition immediately before coating the composition. Therefore, the conventional coating composition experiences various problems of increase of viscosity and others resulting from the short pot life thereof. Using the conventional coating composition, a satisfactory magnetic recording medium cannot be obtained which is comparable to that of the present invention and the manufacture efficiency is extremely poor.

The present invention now will be illustrated by way of the following examples and comparative examples. However, these illustrative examples should not be construed to limit the present invention in any way. All "parts" recited therein are by weight.

EXAMPLE 1

Magnetic layer coating compositions each comprising the components mentioned below were prepared.

| (1) First Magnetic Layer-Coating Composition: | |
|---|---|
| Co-$\gamma$-Fe$_2$O$_3$ (Hc = 650 Oe; BET specific surface area = 38 m$^2$/g) | 100 parts |
| Tetra-Functional Glycidylamine Compound (TETRAD-C, manufactured by Mitsubishi Gas Chemical Co.) (glycidylamine type epoxy resins of the present invention) | 1 part |
| Vinyl Chloride Copolymer (containing —SO$_3$Na group (6 × 10$^{-5}$ eq/g), —OH group (20 × 10$^{-5}$ eq/g) and glycidyl group (4 × 10$^{-5}$ eq/g), and having vinyl chloride content of 86 wt % and polymerization degree of 380) | 12 parts |
| Polyester Polyurethane (containing —SO$_2$Na group (8 × 10$^{-5}$ eq/g) and —OH group (10 × 10$^{-5}$ eq/g), and having weight average molecular weight of 60,000) | 8 parts |
| Methyl Ethyl Ketone | 10 parts |
| Toluene | 10 parts |
| Cyclohexanone | 10 parts |

The above mentioned components were kneaded with a pressure kneader for 2 hours. Then, the following components were added to the resulting blend and dispersed with a sand grinder to obtain a first layer-coating composition.

| | |
|---|---|
| Stearic Acid | 2 parts |
| Tridecyl Stearate | 2 parts |
| Carbon Black (mean grain size: 40 nm) | 2 parts |
| Methyl Ethyl Ketone | 100 parts |
| Toluene | 150 parts |
| Cyclohexanone | 50 parts |
| (2) Second Magnetic Layer-Coating Composition: | |
| Co-$\gamma$-Fe$_2$O$_3$ (Hc = 700 Oe; BET specific surface area = 48 m$^2$/g) | 100 parts |
| Vinyl Chloride Copolymer (containing —SO$_2$Na group (6 × 10$^{-5}$ eq/g), —OH group (40 × 10$^{-5}$ eq/g) and glycidyl group (20 × 10$^{-5}$ eq/g), and having vinyl chloride content of 86 wt % and polymerization degree of 260) | 12 parts |
| Polyester Polyurethane | 8 parts |

-continued

| | |
|---|---|
| (containing —SO$_3$Na group (8 × 10$^{-5}$ eq/g) and —OH group (10 × 10$^{-5}$ eq/g) and having weight mean molecular weight of 30,000) | |
| Methyl Ethyl Ketone | 20 parts |
| Toluene | 20 parts |
| Cyclohexanone | 20 parts |

The above mentioned components were kneaded with an open kneader (manufactured by Moriyama Seisakusho K.K.) for 3 hours. Then, the following components were added to the resulting blend and dispersed with a sand grinder.

| | |
|---|---|
| Carbon Black (mean grain size: 80 nm) | 2 parts |
| Stearic Acid | 2 parts |
| Tridecyl Stearate | 2 parts |
| Methyl Ethyl Ketone | 100 parts |
| Toluene | 150 parts |
| Cyclohexanone | 50 parts |

To the resulting dispersion were added 5 parts by weight of polyisocyanate compound (Coronate L, manufactured by Nippon Polyurethane Co.) and 20 parts by weight of methyl ethyl ketone. These components were further blended to obtain a second magnetic layer-coating composition.

The previously prepared first magnetic layer-coating composition was coated on a polyethylene terephthalate support (thickness: 15 μm) with a reverse roll, the ultimate dry thickness of the layer being 3.0 μm. Afterwards, while the thus coated first magnetic layer was still wet, the second magnetic layer-coating composition was coated over the first layer with a reverse roll, the ultimate dry thickness of the second layer being 0.5 μm. Then, the thus coated magnetic layers were orientation-treated with a magnet, dried and supercalender-treated. This medium was then slitted into a ½-inch video tape.

EXAMPLE 2

A video tape was prepared in the same manner as in Example 1, except that the vinyl chloride copolymer used therein was replaced by a vinyl chloride copolymer (containing —COOH group (60×10$^{-5}$ eq/g) and —OH group (100×10$^{-5}$ eq/g) and having vinyl chloride content of 86 wt% and polymerization degree of 300) as used in preparing the first magnetic layer-coating composition.

EXAMPLE 3

A video tape was prepared in the same manner as in Example 1, except that the vinyl chloride copolymer used therein was replaced by a vinyl chloride copolymer (containing —OPO$_3$H$_2$ group (60×10$^{-5}$ eq/g) and —OH group (100×10$^{-5}$ eq/g) and having vinyl chloride content of 86 wt% and polymerization degree of 200) as used in preparing the first magnetic layer-coating composition.

EXAMPLE 4

A video tape was prepared in the same manner as in Example 1, except that the polyester polyurethane used therein was replaced by a polyester polyurethane (containing —COOH group (5×10$^{-5}$ eq/g) and —OH group (20×10$^{-5}$ eq/g), and having weight mean molecular weight of 40,000) as used in preparing the first magnetic layer-coating composition.

EXAMPLE 5

A video tape was prepared in the same manner as in Example 1, except that the polyether polyurethane used therein was replaced by a polyether polyurethane (containing no polar group and having weight mean molecular weight of 30,000) as used in preparing the first magnetic layer-coating composition.

EXAMPLE 6

A video tape was prepared in the same manner as in Example 1, except that epoxy compound of YH 434 (manufactured by Toto Chemical Co.) (glycidylamine type epoxy resins of the present invention) was used in preparing the first magnetic layer-coating composition in place of the tetra-functional glycidylamine.

EXAMPLE 7

A video tape was prepared in the same manner as in Example 1, except that the epoxy compound was blended with 100 parts of the fine ferromagnetic powder along with 500 parts of methyl ethyl ketone before kneading. After the solvent was removed and dried up so that the fine ferromagnetic powder was surface-treated with the epoxy compound, the remaining components except for the previously added epoxy compound were added and the mixture kneaded to prepare the first magnetic layer-coating composition.

COMPARATIVE EXAMPLE 1

A video tape was prepared in the same manner as in Example 1, except that no epoxy compound was added to the first magnetic layer-coating composition.

COMPARATIVE EXAMPLE 2

A video tape was prepared in the same manner as in Example 1, except that no polyisocyanate compound was added to the second magnetic layer-coating composition.

COMPARATIVE EXAMPLE 3

5 parts of polyisocyanate compound was added to the first magnetic layer-coating composition of Example 1 and the viscosity of the resulting composition was measured as described below.

The coating compositions and video tapes as prepared above were examined and evaluated with respect to the following properties and characteristics, and the results obtained are shown in Table 1 below.

(1) Pot Life of First Magnetic Layer-Coating Composition

After completing the kneading and dispersing steps, the coating composition was stirred at 23° C. whereupon the variation of the viscosity with the passage of time was measured by the use of a B-type Viscometer.

Additionally, the composition was coated with an applicator to form a layer having a dry thickness of 3 μm. The surface of the coated layer was examined with a microscope. The surface with no abnormal appearance was assigned a mark "G", while the surface with a rough appearance was assigned a mark "B".

(2) Audio Output

Using VTR AG6800 (manufactured by Matsushita Electric Co), a sine wave signal of 1 KHz was recorded on each video tape sample at a standard input level under a standard bias condition. The reproduction output level from the recorded sample was measured with a level meter, whereupon the difference in the measured level between the same tape and the comparative tape of Comparative Example 1 was represented by a unit of dB.

(3) Increase of Dropouts

Using the same VTR recorder as that used in previous (2), each sample tape was repeatedly run (120 minute length; 50 pass repetition) under the condition of 0° C. and 10% RH atmosphere. Then, the number of dropouts (5 μsec or more) were counted by the use of a dropout counter based on 1 minute running of each tape.

TABLE 1

Pot Life of First Magnetic Layer-Coating Composition

| | Variation of Viscosity with the Passage of Time of Coating Composition (ps) Measured with B-Type Viscometer | | | Surface Appearance of First Magnetic Layer Coated | | |
|---|---|---|---|---|---|---|
| | 0 Hour | 4 Hours | 8 Hours | 0 Hour | 4 Hours | 8 Hours |
| Example 1 | 83 | 85 | 86 | G | G | G |
| Example 2 | 78 | 80 | 82 | G | G | G |
| Example 3 | 72 | 73 | 74 | G | G | G |
| Example 4 | 70 | 76 | 78 | G | G | G |
| Example 5 | 71 | 73 | 74 | G | G | G |
| Example 6 | 80 | 84 | 85 | G | G | G |
| Example 7 | 78 | 81 | 82 | G | G | G |
| Comparative Example 1 | 70 | 78 | 83 | G | G | G |
| Comparative Example 2 | — | — | — | — | — | — |
| Comparative Example 3 | 91 | 149 | 296 | G | B | B |

TABLE 2

| | Audio Output (dB) | Dropouts (min) |
|---|---|---|
| Example 1 | +1.5 | 13 |
| Example 2 | +1.2 | 8 |
| Example 3 | +1.7 | 7 |
| Example 4 | +1.4 | 10 |
| Example 5 | +1.5 | 11 |
| Example 6 | +1.4 | 5 |
| Example 7 | +1.2 | 9 |
| Comparative Example 1 | ±0.0 | 170 |
| Comparative Example 2 | +0.9 | 150 |
| Comparative Example 3 | (No sample was formed because coating was impossible.) | |

As is apparent from the results in Table 1 and Table 2 above, the magnetic recording tape samples of the present invention had an excellent audio characteristic and obtained few dropouts in the repeated running test. Therefore, when the magnetic recording medium of the present invention is used as a video tape, it yields an extremely high reproduction output and has good running property and durability even under a severe condition of high temperature and high humidity.

In contrast to the medium of the present invention having such advantageous merits, when an epoxy compound and a polyisocyanate compound are combined in a conventional single magnetic layer type recording medium, it necessarily requires preparation of a coating composition containing both the epoxy and polyisocyanate components. In that case, however, the pot life of the coating composition is extremely short in the actual manufacturing process, even if one of either the epoxy compound or polyisocyanate compound is added later to the composition immediately before coating. Therefore, the single magnetic layer-coating composition experiences various problems of increase in viscosity and others because of the short pot life thereof. Using such conventional defective coating compositions, a satisfactory magnetic recording medium like that of the present invention could not be obtained, or the manufacture efficiency is extremely poor.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon plural magnetic layers comprising a ferromagnetic powder and a binder, wherein said magnetic layers are composed of at least two magnetic layers and are formed by coating a first magnetic layer-coating composition containing an epoxy compound having at least two epoxy groups and substantially no polyisocyanate compound on the non-magnetic support and coating a second magnetic layer-coating composition containing a polyisocyanate compound and substantially no epoxy compound over the first magnetic layer with a simultaneous or successive multiple layered coating method.

2. The magnetic recording medium as in claim 1, wherein said first magnetic layer-coating composition is prepared by first kneading a ferromagnetic powder, an epoxy compound having at least two epoxy groups and a portion of binder and solvent followed by adding the remaining binder and solvent to the resulting blend and dispersing the composition.

3. The magnetic recording medium as in claim 1, wherein said first magnetic layer-coating composition is prepared by dispersing a ferromagnetic powder, which has been previously surface-treated by adsorbing said epoxy compound having at least two epoxy groups, in a binder.

4. The magnetic recording medium as in claim 1, wherein said binder contains a resin having at least one polar group selected from the group consisting of —COOM, —SO$_3$M, —SO$_4$M, —PO$_3$M$_2$, —OPO$_3$M$_2$ (where M means a hydrogen atom, an alkali metal or an ammonium group), an amino group, an ammonium salt group, —OH, —SH and an epoxy group.

5. The magnetic recording medium as in claim 1, wherein said binder is selected from the group consisting of vinyl chloride copolymers, acrylic resins, cellulose resins, polyurethane resins, polyester resins and polyether resins, or mixtures thereof.

6. The magnetic recording medium as in claim 1, wherein said binder is comprised of a polyurethane resin having three or more —OH groups in the molecule and having a polar group in an amount of from $0.5 \times 10^{-5}$ to $60 \times 10^{-5}$ eq/g.

7. The magnetic recording medium as in claim 1, wherein said binder is selected from one of a vinyl chloride or acrylic resin having an —OH group in an amount of from $5 \times 10^{-5}$ to $200 \times 10^{-5}$ eq/g, an epoxy group in an amount of from $0.5 \times 10^{-5}$ to $100 \times 10^{-5}$ eq/g and a polar group in an amount of from $0.5 \times 10^{-5}$ to $60 \times 10^{-5}$ eq/g and having a polymerization degree of from 200 to 600.

8. The magnetic recording medium as in claim 1, wherein said epoxy compound has a molecular weight of 1,000 or less.

9. The magnetic recording medium as in claim 1, wherein said epoxy compound is an amine type epoxy resin having a molecular weight of 1,000 or less.

10. A method for preparing a magnetic recording medium comprising a nonmagnetic support having thereon magnetic layers comprising a ferromagnetic powder and a binder, wherein said magnetic layers are composed of at least two layers and are formed by the steps including coating a first magnetic layer-coating composition containing an epoxy compound having at least two epoxy groups and substantially no polyisocyanate compound on the nonmagnetic support and coating a second magnetic layer-coating composition containing a polyisocyanate compound and substantially no epoxy compound over the first magnetic layer with a simultaneous or successive multiple layered coating method.

* * * * *